United States Patent [19]

Besse et al.

[11] Patent Number: 5,587,009
[45] Date of Patent: Dec. 24, 1996

[54] ADHESIVE RELEASE AGENT APPLIED TO SURFACE FOR IMPROVED CLEANING

[75] Inventors: Michael E. Besse, Golden Valley; Cynthia L. Ross, Roseville; Helen A. Kleaver, Prior Lake, all of Minn.

[73] Assignee: Ecolab Inc., St. Paul, Minn.

[21] Appl. No.: 489,692

[22] Filed: Jun. 12, 1995

[51] Int. Cl.⁶ .................................................. B29C 33/60
[52] U.S. Cl. .......................... 106/244; 106/2; 106/38.24; 106/267; 427/155
[58] Field of Search ........................ 106/2, 38.24, 267, 106/244; 427/155

[56] References Cited

U.S. PATENT DOCUMENTS

| | | | |
|---|---|---|---|
| 2,494,771 | 1/1950 | Markley | 426/609 |
| 4,023,912 | 5/1977 | Mahler et al. | 106/244 |
| 4,096,258 | 6/1978 | Hanson | 426/250 |
| 4,108,678 | 8/1978 | Szuhaj et al. | 106/244 |
| 4,155,770 | 5/1979 | Doumani | 106/267 |
| 4,261,609 | 12/1983 | Hanson, Jr. et al. | 426/609 |
| 4,420,496 | 12/1983 | Hanson, Jr. et al. | 426/609 |
| 4,874,618 | 10/1989 | Seaborne et al. | 426/76 |
| 5,137,793 | 8/1992 | Cockrell, Jr. | 428/688 |
| 5,284,690 | 2/1994 | Williams et al. | 429/4 |
| 5,296,021 | 3/1994 | Clapp et al. | 106/2 |
| 5,431,719 | 7/1995 | Clapp et al. | 106/2 |

FOREIGN PATENT DOCUMENTS

| | | |
|---|---|---|
| 2000422 | 9/1969 | France. |
| 1-181739 | 7/1989 | Japan. |
| 5-309663 | 11/1993 | Japan. |
| 5-309633 | 11/1993 | Japan. |
| 770772 | 3/1957 | United Kingdom. |

*Primary Examiner*—Melissa Bonner
*Attorney, Agent, or Firm*—Merchant, Gould, Smith, Edell, Welter & Schmidt, P.A.

[57] ABSTRACT

The invention is methods and compositions for removing bonding agents from the hard surfaces of machinery and, in its most preferred mode packaging equipment. The release composition comprises lecithin and a hydrophobic carrier. The method comprises the steps of applying a release composition to the surfaces of the packaging equipment. The packaging equipment is then used. Any bonding agent deposited on the treated areas of the packaging equipment may then be removed. The invention is applicable to any number of package and container manufacture environments including package assembly, package sealing, product sealing, and labeling.

11 Claims, No Drawings

5,587,009

ADHESIVE RELEASE AGENT APPLIED TO SURFACE FOR IMPROVED CLEANING

FIELD OF INVENTION

The invention generally relates to release composition comprising hydrophobic constituents. More specifically, the invention relates to compositions which facilitate the release of bonding agents used in manual and automated processes to assemble containers, packaging and labels. Bonding agents such as adhesives, including thermoset and thermoplastic adhesives as well as those adhesives based in aqueous and nonaqueous solutions, emulsions, and suspensions are used in any number of applications. Given the application, these adhesives may be deposited indiscriminately over any number of surfaces including packaging surfaces as well as the surface of the machine. The invention provides a release agent for removal of these bonding agents from the operational substrates and surfaces of equipment.

BACKGROUND OF THE INVENTION

Packaging is one area frequently overlooked in attempts to reduce cleaning time, labor and cost. Hot-melt glues and liquid adhesives are often used in sealing cartons, containers, and other packages. In industrial applications, packaging is completed through automated equipment. The emphasis of these processes and machines is the construction and sealing of packaging in an efficient manner to produce packaging of high structural integrity.

In this context, the emphasis on bonding agent application is often the quantity and strength of the adhesive rather than the accurate delivery and placement of "just enough" bonding agent to avoid spillage.

Excess bonding agent may find its way onto machine surfaces as a result of overspray, spillage, or attempts to apply the adhesive out of sequence in an automated line. The resulting spillage may contact any number of machine surfaces or substrates such as conveyor mechanisms, decking, or framework. These machine surfaces or substrates may comprise any metal, metal-alloy, composite, ceramic, polymeric, or plastic compositions. As a result, during processing, adhesives may deposit and stick onto any number of surfaces during application such as the packaging machine, conveyor equipment, as well as transport and storage equipment. Removal of these adhesives can require extended hot-water sprays of several hours directed at the bonding agents, just to allow for manual scraping. Attempts with much stronger, potentially harmful chemicals get mixed, often poor results.

Various release agents have been known and used before in any number of applications. For example, in the area of foods, Seaborne et al, U.S. Pat. No. 4,874,618 discloses a two-compartment food package separated by an edible barrier useful in the containment of food articles. In the various examples of the patent, the edible barrier comprises food products ground in with various grains and other fillers as well as minor amounts of ingredients such as lecithin, intended to hold the composition together.

Hanson, Jr. et. al, U.S. Pat. No. 4,420,496 discloses a release agent which is useful for frozen food products which are stored in low temperature environments. The Hanson et al release agent may comprise an oil such as almond oil, apricot kernel oil, safflower seed oil, walnut oil, cherry kernel oil, and rapeseed oil combined with lecithin or a lecithin-white mineral oil mixture. The ultimate Hanson, Jr. et al composition is intended to have a viscosity which will allow the composition to maintain a substantial liquid form even when stored at below freezing temperatures.

Clapp et al, U.S. Pat. No. 5,296,021 discloses an aerosol-dispensable foodstuff parting composition. The Clapp et al composition is a water-in-oil emulsion of lecithin or lecithin derivatives and edible oil, as well as an emulsifying agent, water, and a pressurized normally gaseous propellant.

Release agents have also been used in various applications for the manufacture of molded plastics and thermally formed materials. Specifically, a published unexamined Japanese patent application 1-181739 to Sato et al discloses the use of a hydrophilic animal or vegetable lecithin as a release agent for food products and molded plastic materials. Specifically, in Example 9 of Sato et al, a release agent comprising a hydroxylated soybean lecithin, diluted in water, is compared to a lecithin composition diluted in toluene. These two compositions are used as release agents for heat-molded styrene resin products which result from an injection molding apparatus. Sato et al discloses the use of a hydrophilic lecithin dispersed in water for use in food-related applications, as well as industrial applications such as mold release agents.

Additionally, published unexamined Japanese Patent Application 5-309,663 to Kuroda et al discloses a release agent for molding resin products that are environmentally safer and industrially more efficient to use. The Kuroda et al composition preferably comprises a mixture of terpene-type cyclic hydrocarbons such as dipentene, limonene and isoparaffin hydrocarbon oils as well as a minor portion of lecithin.

Silicon-based release agents are also known such as products from Clearko, Inc. and Wesson. While these products tend to have broad applicability, silicon-based compositions tend to film the surface of application and, are generally not food grade.

These compositions and applications do not address the various problems encountered in the area of packaging. In these instances, bonding agents may have to be removed from machinery, conveying equipment, and even packaging materials quickly and efficiently without the use of heat or other agents or conditions which hamper processing. For example, the perishable nature of food requires that any packaging have a high structural integrity to provide for a hermetic seal, strength, and freedom from contamination. Further, the very nature of food, in that it is ultimately intended for consumption, requires that the food not only be kept free from external contamination, but also be kept free from contamination by any elements with which it comes into contact during preparation, packaging, storage and consumption.

Additionally, there is a need in other packaging environments to provide for release of bonding agents without creating deleterious effects on packaging equipment, the articles being packaged, as well as avoiding inefficiencies within the packaging process.

SUMMARY OF THE INVENTION

In accordance with a first aspect of the invention, there is provided compositions for the removal or release of bonding agents from the surface of packaging machinery, apparatus and facilities. The composition of the invention generally comprises a lecithin compound and a hydrophobic carrier.

In accordance with a second aspect of the invention, there is provided a method for removing bonding agents from operational substrates in the packaging environment. The method comprises the steps of applying a release agent to a substrate, contacting the substrate with a bonding agent, and removing any bonding agent from the areas of the substrate treated with the release agent.

The invention addresses the need for a release agent in the packaging area or any other area where excessive dripping, splattering, or contact with bonding agents presents a cleanup or removal problem. The claimed invention is preferably used in a food, beverage or dairy packaging environment. In these cases, regulations may limit uses of other types of glue removers or release agents. The use of food-safe components in this invention assures acceptance into USDA-inspected plants. It may be applied on the surfaces by spraying, brushing, spreading, wiping, or dipping.

The invention is based on the discovery that lecithin combined with a hydrophobic carrier surprisingly provides extraordinary release properties for the removal of bonding agents, adhesives, and the like. Indeed, this discovery, combined with the fact that lecithin meets "food grade" purity requirements in accordance with the specification as defined by the Food Chemicals Codex and is a recognized "food additive" by the United States Food and Drug Administration, makes this release composition very unique. Generally, the composition of the invention is applicable to all food packaging, collection, process, and storage environments and facilities as well as any other contact sensitive areas which the food may encounter during preparation, packaging, storage, and consumption. These areas of use include the manual and automated assembly of packaging and containers, package and container sealing, as well as final product sealing.

In the context of the invention, "bonding agents" include any and all adhesives such as thermoplastic and thermosetting compositions used in packaging including those based on solvent, emulsion, and suspension chemistry as well as those systems which are free of aqueous or organic solvents.

Exemplary bonding agents include thermoplastic constituents such as vinyl polymers, polyesters, polyamides, polyimides, polyamide-imides, polyethers, block polyamides-polyethers, block polyester-polyethers, polyolefins, polycarbonates, polysulfones, poly bisimidazoles, polybisoxazoles, polybisthiazoles, and polyphenyl polymers. Other exemplary thermoplastic adhesives contain constituents which include nylons, polyacetals, polyester elastomers, polyurethanes, polyphenyl-aniline sulfides, polypropylenes, polyether ether ketones, as well as elastomeric thermoplastics constituents including butyl rubber, ethylene vinyl acetate copolymers, and the constituents of as ABS, SBS and SIS block copolymers and the like.

Vinyl polymers are also exemplary of constituents found in bonding agents which may be removed by the compositions and methods of the invention including polyethylene, polypropylene; rubbery polymers and copolymers prepared from monomers including ethylene, propylene, styrene, acrylonitrile, butadiene, isoprene, and others; acrylic acid, methacrylic acid, methylacrylate, methylmethacrylate, vinyl acetate, hydroxy methacrylate, hydroxy ethylacrylate, as well as other known vinyl monomers.

Bonding agents treatable with the compositions and methods of the invention include thermosetting constituents such as epoxies, polyurethanes, curable polyesters, hybrid thermosets, curable acrylics, bismaleimides such as the partial reaction product of the bismaleimide of methyl dianiline, silicons, phenolics, polyamides, polysulfides, curable and unsaturated polyester resins such as, for example, maleate resins formed by the reaction of various polyols and maleic anhydride, orthophthalic resins formed by reaction of phthalic anhydride and maleic anhydride or fumaric acid and as the dibasic acids.

Other exemplary thermosetting constituents which may be treated with the compositions and methods of the present invention include the reaction product of orthotolyl biguanide and the diglycidyl ether made from bis-phenol A-epichlorohydrin; triglycidyl isocyanurate thermosetting compositions; bis-phenol A-epichlorohydrin diglycidyl ether cured with phenolic crosslinking agents; aliphatic urethane thermosetting compositions such as an unblocked isofuron diisocyanate-E-caprolactam; BTDA thermosetting compositions which are generally the reaction product of 3,3,4,4-benzophenone tetracarboxylic dianhydride and a bis-phenol A-epichlorohydrin diglycidyl ether; hybrid thermosetting compositions which are the reaction product of a carboxylated saturated polyester curing agents and bis-phenol A-epichlorohydrin diglycidyl ether; standard bis-phenol A-epichlorohydrin diglycidyl ether thermosets such as those which are cured from 2-methylimidazole; and standard bis-phenol A-epichlorohydrin diglycidyl ether thermosets which are cured with 2-methylimidazole and dicyandiamide thermosetting compositions.

In the context of this invention, the term "substrate" means any material which may be used in the manufacture of packaging, packaging or container sealing, and final product sealing. Representative substrate materials include acrylics, aluminum compounds, ceramics, copper compounds, fiberglass, hardwoods, leathers, nylons, particle board, polycarbonate, polyethylene, polypropylene, polystyrene, polyvinylchloride, rubbers, and metal alloys including any of the various grades of steel or steel products used in the machinery or packaging or packaging sealing.

Substrates which may be exposed to adhesives may generally be found on any equipment used in the packing or packaging industry including that made by Brenton Engineering Company, Loveshore Corporation, Paxall Pak, or Douglas Machine. One representative machine includes the automatic Knock-Down case packer from Brenton Engineering Company of Alexandria, Minn. The elements of these machines which may be subjected to bonding agent overspray, spillage, or contact, include framework, decking, and conveyor mechanisms such as belts, rollers, and the like.

DETAILED DESCRIPTION OF THE PREFERRED EMBODIMENTS

The invention is compositions and methods for release of bonding agents from contacted substrates. The composition of the invention comprises lecithin and a hydrophobic carrier, along with any adjuvants which may be desired. Also included are methods for removing bonding agents from the various substrates of machinery such as packaging equipment. The method includes applying a releasing composition to the substrate; using the equipment; and removing any bonding agent from treated surfaces.

A. The Composition

The composition of the invention generally comprises an active releasing agent, comprising lecithin. Lecithin functions to effect release of the bonding agent adhesives from areas unintended for application, in the packaging environment. Lecithin provides the necessary polarity to attach to any variety of substrates and, in turn, forms a barrier layer which precludes adhesion. Lecithin also has the appropriate heat stability to maintain a barrier layer in a variety of thermal conditions (preferably as high as 275° C.).

Depending upon the adhesive as well as the environment of use, there are any number of theories of adhesion. The diffusion theory assumes mutual solubility of the substrate and the adhesive to form a true interface between adhesive and substrate. The electrostatic energy theory is based on the difference in electronegativities between two adhering materials. The theory of surface activity is based on the effect of intermolecular and interatomic forces on the surface energies of the adhesive and the substrate and the interfacial energy between the two provide a theoretical basis for adhesive action. Finally, the theory of adhesion based upon mechanical interlocking looks at the physical properties of the substrate and adhesive as well as the geometric arrangement of these two components within the adhesive bond.

Applicants do not know, and do not wish to be bound to, a theory of activity of the composition of the invention. However, it is believed that the composition of the invention forms a barrier layer on the surface of application which effectively precludes the formation of an adhesive bond. It is believed that lecithin functions to reduce the structural integrity or efficacy of the bond created by the bonding agent in the packaging environment.

Lecithin is a complex mixture of acetone-insoluble phosphatides (phospholipids) comprised mostly of phosphatidylcholine and lesser amounts of phosphatidylethanolamine and phosphatidylinositol. Lecithin is also comprised of varying amounts of other materials such as triglycerides, diglycerides, monoglycerides, free fatty acids, free sterols and carbohydrates. Commercially available lecithins generally fall into three classes; natural lecithins, refined lecithins and chemically modified lecithins, and are available in fluid form containing the above components in various combinations and proportions dissolved in soybean oil, usually containing from about 50 to 65 percent acetone-insolubles (phospholipids) by weight of lecithin including the oil. In liquid form, the lecithin is available in different viscosities. The lecithin may be unbleached or, in order to lighten its color, it may be bleached, usually by peroxides, and may be filtered or otherwise refined.

Lecithin contains different functional groups that make it reactive in a number of chemical reactions. Chemically modified lecithins suitable for use in the composition of this invention include by way of example and not be way of limitation, acylated, preferably acetylated lecithin, hydroxylated lecithin, and acetylated and hydroxylated lecithin. These lecithins are commercially available and sold, for example, under the trade name Centrophase HR (an acetylated lecithin) and Centrolene A (a hydroxylated lecithin), both available from Central Soya Co., Inc., METARIN™ DA51 and METARIN™ HA-51 available from Lucas Meyer, and Thermolec WFC (an acetylated-hydroxylated lecithin) available from Archer Daniels Midland Company.

The composition of the invention may generally contain any range of concentrations of lecithin. Generally, the concentration of lecithin may range from about 5 wt-% to 95 wt-%, preferably from about 10 wt-% to 50 wt-%, and most preferably from about 20 wt-% to 30 wt-%. We have found that concentrations of lecithin lower than those provided above may be used. However, lowering the concentration of lecithin has a tendency of reducing the release properties of the bonding agent from the substrate.

Using concentrations of lecithin higher than those provided above may also be undertaken in accordance with the invention. However, higher concentrations of lecithin may result in no increased efficacy with the release agent composition of the invention. Higher concentrations of lecithin also have a tendency to affect the properties of the composition of the invention by increasing viscosity and reducing the efficiency and ease with which the composition of the invention may be applied to any substrate.

Carrier

In order to ease application of the lecithin used in the composition of the invention as well as facilitate the formation of a barrier layer, the composition of the invention also comprises a carrier. The carrier functions to modify the physical properties of the lecithin compound to make it more spreadable and less viscous. Further, the carrier facilitates and increases the properties of the composition once applied to the substrate of choice. Further, the carrier may be used to effect changes in barrier properties such as heat tolerance and overall physical integrity of the composition of the invention once applied as a barrier layer.

The carrier used in the composition of the invention is preferably hydrophobic. In this context, hydrophobicity means that any carrier constituent has a solubility in water of less than 1 wt-% (0.01 gms per fluid cc).

Preferably, the carrier is also generally recognized as safe in food contact and food preparation environments including those environments where food packaging and sealing is completed. General families of carriers which may be used in the context of this invention include aliphatic hydrocarbon oils such as vegetable oils, mineral oils, mineral seal oil and other nonvolatile solvents which have a hydrophobic character.

Also useful are various aliphatic hydrocarbon-based vegetable oils such as those containing carboxylic acids including butyric, caproic, caprylic, capric, lauric, lauroleic, myristic, myristoleic, pentadecanoic, palmitic, palmitoleic, margaric, stearic, oleic, linoleic, linolenic, ricinoleic, dihydroxystearic, licanic, eleostearic, arachidic, eicosenoic, dicosapolyenoic, behenic, erucic, docosapolyenoic, lignoceric, tetracosenoic, and tetracosapolyenoic, among others.

These carboxylic acids are the basis for any number of oils which may be used as the carrier in the composition of the invention. Such oils include babassu, butterfat, castor, cocoa butter, coconut, corn, cottonseed, herring, lard, linseed, menhaden, mustard seed, Neats foot, oiticica, olive, palm, palm kernel, peanut, perilla, rapeseed, rice bran, safflower, sardine, sesame, soybean, sperm-body or -head fatty acids, sunflower, tall oil, tallow, tung oil and whale oil, among others.

Useful aliphatic esters having carboxylic acid-derived portions of more than seven carbons include vegetable oils and animal-derived fatty materials. Useful vegetable oils include soybean oils, cotton oils, other vegetable cooking or salad oils. Useful animal-derived fatty materials include lard, butter, and beef suet.

Preferred hydrophobic carriers include white mineral oil having a specific gravity of 0.83–0.90 at 20° C. and a viscosity of 150–220 cps at 72° F.; isoparaffinic solvents such as ISOPAR® M available from EXXON Corporation; mineral seal oil such as that available from Ashland Chemical, Inc.; high stability salad oil available from Karlshamns under the tradename Clarity; sunflower oil available from SVO Specialty Products, Inc. under the tradename TRISUN® 80, partially hydrogenated soybean oil available from VAN DEN BERGH Food Ingredients Group under the tradename Durkex® 100; and soybean oil having a specific gravity of 0.91–0.93 at 20° C., an iodine value of 103–115 (for a 1.5 gm sample), an acid value 0.1 maximum (for a 15 gm sample), and a saponification value of 189–195 (for a 4–5 gm sample).

Mineral oil used in the context of the invention is preferably a white mineral oil, food grade, typically having a viscosity at 72° F. in the range of from about 150–220 and a specific gravity at 20.0° C. of from about 0.85 to about 0.9.

The concentration of carrier used in the composition of the invention may range from about 5 wt-% to 95 wt-%, preferably from about 50 wt-% to 90 wt-%, and most preferably from about 70 wt-% to 80 wt-%. When the composition of the invention comprises mineral oil, the mineral oil is generally present at a concentration ranging from about 5 wt-% to 95 wt-%, preferably from about 50 wt-% to 90 wt-%, and most preferably from about 70 wt-% to 80 wt-%. When the carrier of the invention comprises a vegetable oil, the vegetable oil is generally present at a concentration ranging from about 5 wt-% to 95 wt-%, preferably from about 50 wt-% to 90 wt-%, and most preferably from about 70 wt-% to 80 wt-%.

When the carrier of the invention comprises a soybean oil, the soybean oil will be present in a concentration ranging from about 5 wt-% to 95 wt-%, preferably from about 50 wt-% to 90 wt-%, and most preferably from about 70 wt-% to 80 wt-%. Use of concentrations greater than these provided above may reduce the release activity of the lecithin. Further, higher concentrations of carrier may also deleteriously affect the physical properties of the barrier layer ultimately formed on the substrate of choice.

The use of concentrations lower than those provided above for the carrier of the composition of the invention may result in undesirable increases in viscosity in the composition of the invention. Further, the use of lower compositions of carrier may also affect the barrier properties of the composition of the invention in a way unintended by the user.

TABLE 1

| | wt % | | |
| --- | --- | --- | --- |
| Constituents | Preferred | More Preferred | Most Preferred |
| Lecithin | 5–95 | 10–50 | 20–30 |
| Carrier | 5–95 | 50–90 | 70–80 |

B. Formulation

The composition of the invention may be formulated through any means known to those of skill in the art by combining the desired concentrations of lecithin and carrier with manual or automated mixing. If higher concentrations of lecithin are used, heating up to 140° F. has been used to blend lecithin and carrier into a homogenous state. High speed automated mixing may also be used to blend the composition of the invention.

C. The Method

The composition of the invention may be applied to any number of substrates such as those provided in this disclosure. The application of the composition may be completed through spraying, wiping, and brushing among other processes. The composition may be applied at any temperature suitable to facilitate the formation of a barrier layer of the appropriate thickness. Preferably, the barrier layer has a thickness (measured in thousandths of an inch) ranging from about 1 mils to about 20 mils, more preferably from about 2 mils to 15 mils, and most preferably from about 2.5 mils to 12 mils. The composition of the invention may be applied to any equipment substrate in the packing or packaging environment.

Prior to application, the composition of the invention generally has a viscosity of 5 to 1200 cps at 25° C., preferably has a viscosity of 10 to 500 cps at 25° C., and most preferably has a viscosity of 80 to 200 cps at 25° C. Application of the composition of the invention may be completed by any means known to those of skill in the art including spray pump, aerosol without commingling the propellant and release composition, wipe, brush, or immersion among other methods. As the composition of the invention does not crosslink or cure, there is no set-up time after application. The composition of the invention should be applied to a clean, dry surface for best efficacy. The composition of the invention may be applied to both flexible and inflexible surfaces such as hardened metal, plastic, or composite surfaces or more flexible conveyor or partition materials.

WORKING EXAMPLES

The following working examples are provided to illustrate the various aspects of the invention. However, these working examples should not be viewed as limiting of the invention as only the claims define the invention disclosed herein.

Working Example 1

An analysis was undertaken using the composition of the invention which was applied to the panels before applying the labeler glue. Two panels were coated with the composition of the invention, formulated to include soybean oil (70 wt-%), and lecithin (30 wt-%), which was drained from the panels. Subsequently, labeler glue was applied to these panels. Two other panels were coated with the composition of the invention and then allowed to dry for several hours (undrained) before applying the glue. All four panels were allowed to sit over night to let the glue set up.

The composition of the invention did not appear to dissolve the glue. But when one edge of the glue was picked up, the whole piece came off the panel. Both the drained and undrained panels gave good results in glue removal.

Working Example 2

Another analysis was undertaken comprising a set of panels each coated with corn oil, drained and undrained as with Example 1. After applying the glue the day before, an attempt was made to remove the glue. It was discovered that the glue could not be removed.

Working Example 3

Additional samples of other types of labeler glues were obtained. Two of the glues were hard, glue gun-like pellets obtained from Swift Adhesives as Brand 80863. The additional glue source was a liquid adhesive obtained from H. B. Fuller as Brand XR 6324. The composition of the invention was spread on stainless steel panels using a towel. Small amounts of the liquid glue were coated onto panels that had been coated with the composition of the invention as well as panels which remained uncoated.

The next day the glue had set up on both group panels. The panels pretreated with the composition of the invention allowed for immediate removal of the set-up glue. On the panels which were uncoated with the composition of the invention, the glue could not be removed.

The pellet-style glues were then melted and coated on a panel which had one-half of its area coated with the composition of the invention, while the remaining area of the panel was left untreated. Once the glue cooled, an attempt was made to remove it. One could easily tell where the composition of the invention started and finished on the panel. The glue on the coated part of the panel lifted right off, while the glue on the uncoated portion remained firmly attached.

Working Example 4

Three sets of panels were prepared to compare silicon-based compositions to those of the claimed invention in using them as adhesive removal agents. The first set of panels was treated with a composition known as Clearko, available from Clearko Products of Pennsylvania. The second set of panels was treated with the composition of the invention and the third set of panels was treated with a Wesson cooking spray which contains silica. Each of the three sets of panels then had applied to it a thin film and a thick film of hot melt adhesive. The adhesive was allowed to set up. In the instance of the Clearko-treated panels, the thin film popped off of the panel and there was no resistance to removal of the thick film. In the instance of the composition of the invention, the thin film glue came off with some effort, while the thick film came off without any resistance.

With the Wesson cooking spray-treated panels, more effort was needed to remove the thin film of adhesive from these panels than that necessary to remove the thin film of adhesive from the panels treated with the composition of the invention. With regard to the thick film, there was no resistance to removal of this film from the panel treated with the Wesson cooking spray.

Working Example 5

Following from the procedure of Working Example 4, additional compositions were tested.

| Working Example | Composition |
| --- | --- |
| 5A | 70% mineral oil, 30% lecithin |
| 5B | 70% mineral seal oil, 30% lecithin |
| 5C | 70% Isopar, 30% lecithin |
| 5D | 90% mineral oil, 10% lecithin |
| 5E | 90% mineral seal oil, 10% lecithin |
| 5F | 90% Isopar, 10% lecithin |

In each instance, panels were treated with Examples 5A–5E as was done in Example 4. With regard to Example 5A, the film of glue was peeled off with a definite sign of oil remaining on the panel. With regard to Example 5B, the film also was easily peeled off. With regard to 5C, the glue was pulled off with less ease. With regard to Example 5D, the glue was peeled off easily. With regard to Example 5E, the adhesive would not peel off the panel. With regard to Example 5F, the adhesive film was not as easily removed.

In subsequent testing, an attempt was made to use the carriers used in Example 5 without lecithin. There was no release of the adhesives without the lecithin present in the system.

The above discussion, examples and embodiments illustrate our current understanding of the invention. However, since many variations of the invention can be made without departing from the spirit and scope of the invention, the invention resides wholly in the claims hereafter appended.

We claim as our invention:

1. A method for removing bonding agents from a substrate, said method comprising the steps of:

(a) applying a release composition to a substrate to form a barrier layer, said release composition comprising an effective adhesive bond releasing amount of lecithin and an amount of hydrophobic carrier effective to provide a barrier layer when said composition is applied on the intended substrate;

(b) contacting the treated substrate with a bonding agent; and (c) removing any bonding agent from the areas of the substrate treated with the release agent, wherein the hydrophobic carrier is selected from the group consisting of an animal-based oil, a vegetable oil, a mineral oil, and mixtures thereof.

2. The method of claim 1 wherein said bonding agent is selected from the group consisting of a thermoplastic adhesive, a thermosetting adhesive and mixtures thereof.

3. The method claim 1 wherein said bonding agent is selected from the group consisting of a solvent based adhesive, an emulsion based adhesive, and mixtures thereof.

4. The method of claim 1 wherein said barrier layer has a thickness of form about 1 mil to 20 mils.

5. The method of claim 1 wherein said release composition has a viscosity of from about 5 cps to 1200 cps at 25° C.

6. The method of claim 1 wherein said barrier layer is applied to said substrate as an aerosol spray.

7. The method of claim 1 wherein said barrier layer is applied to said substrate by wiping.

8. The method of claim 1 wherein said barrier layer has a heat stability up to a temperature of about 275° C.

9. A barrier layer resulting from the method of claim 1.

10. The method of claim 1 wherein said substrate comprises a material selected from the group consisting of a ceramic material, a metal-alloy material, a synthetic polymeric material, a composite material, and combinations thereof.

11. The method of claim 1 wherein the mineral oil is mineral seal oil.

* * * * *